United States Patent [19]

Gessner et al.

[11] 3,725,134
[45] Apr. 3, 1973

[54] EXPENDABLE IMMERSION THERMOCOUPLE UNIT

[75] Inventors: Richard W. Gessner, Massillon; Roy E. Davies, Terrace Park, both of Ohio

[73] Assignee: Massillon Measurement, Inc., Massillon, Ohio

[22] Filed: Apr. 23, 1970

[21] Appl. No.: 31,080

[52] U.S. Cl. .....................136/234, 73/359, 136/235
[51] Int. Cl. ...............................................H01v 1/02
[58] Field of Search ................136/234, 235; 73/359

[56] References Cited

UNITED STATES PATENTS 3,501,957  3/1970  Jones, Jr....................................23/359
3,201,277  8/1965  Fish........................................136/234

Primary Examiner—Carl D. Quarforth
Assistant Examiner—Harvey E. Behrend
Attorney—Ralph Hammar

[57] ABSTRACT

An expendable immersion thermocouple in which the thermocouple and its support and the plug are separate assemblies which may be assembled and tested before mounting in the protective housing.

15 Claims, 9 Drawing Figures

PATENTED APR 3 1973 3,725,134
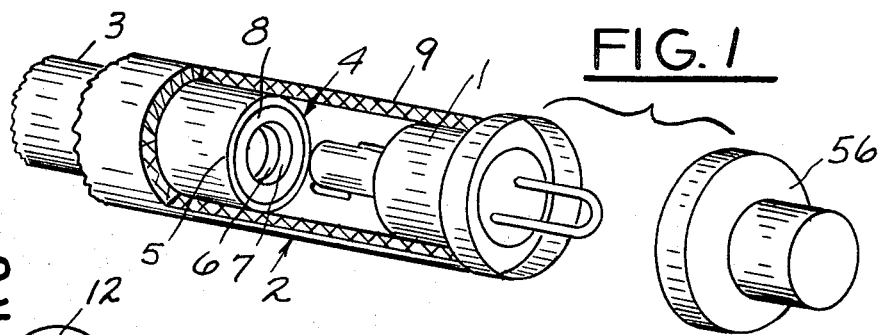
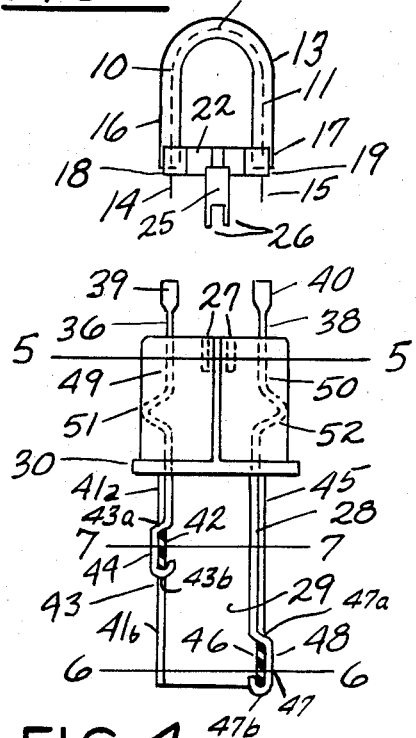
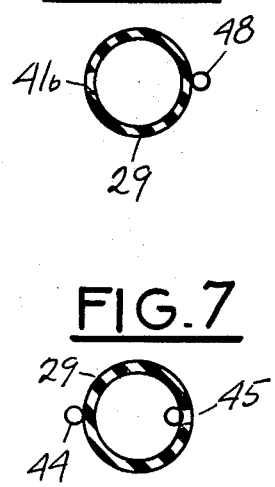
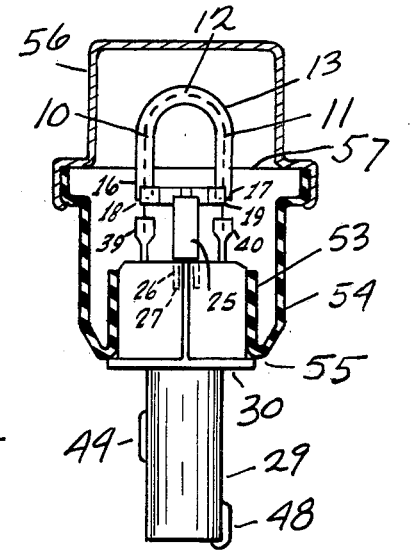
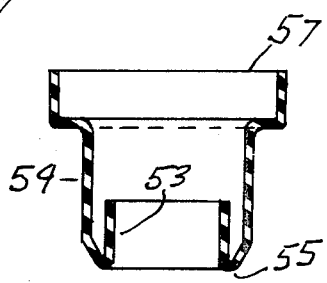
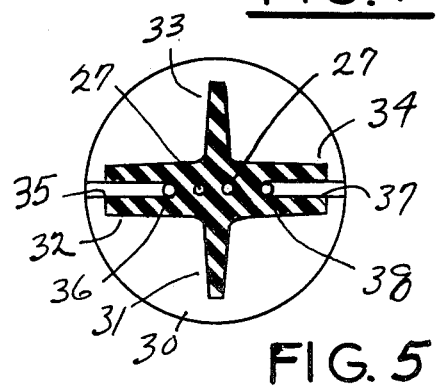
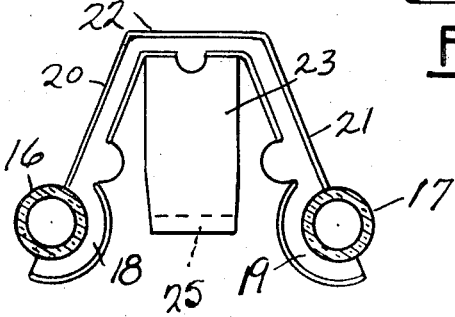
INVENTORS
Richard W Gessner
BY Roy E Davies
Ralph Hammar Attorney

EXPENDABLE IMMERSION THERMOCOUPLE UNIT

This invention is intended to reduce the cost and improve the reliability of expendable immersion pyrometers for measuring the temperature of molten metal.

In the drawing,

FIG. 1 is a perspective view, partly in section, showing the expendable unit mounted on a manipulator of commercial structure;

FIG. 2 is an elevation of a thermocouple and its support;

FIG. 3 is a top plan view of the thermocouple support;

FIG. 4 is an elevation partly in section of the plug carrying the thermocouple support and the electrical contacts for making connection with the manipulator;

FIGS. 5, 6 and 7 are sections on correspondingly numbered lines of FIG. 4;

FIG. 8 is a sectional elevation of the housing; and

FIG. 9 is an elevation partly in section of the completed device.

Referring to FIG. 1 of the drawing, the expendable thermocouple unit 1 of the present invention is shown mounted on the end of a manipulator 2 of commercial structure with the thermocouple unit not fully engaged with the manipulator to show the various parts.

The manipulator 2 is shown merely for the purpose of illustrating the element on which the thermocouple unit is removably mounted in use. The manipulator is in the form of a metal pipe 3 which may be upwards of 8 feet or more in length. A socket or receptacle 4 is mounted on the end of the iron pipe 3, carrying the thermocouple unit 1. It consists of a metal sleeve 5 threaded on the iron pipe 3 and longitudinally spaced annular contacts 6 and 7 supported within the sleeve 5 by a body 8 of electrically insulating material, such as neoprene. The contacts 6 and 7 are connected to a pair of insulated electrically conducting current lead wires which extend through the pipe 3 for connection with a temperature measuring system. Such systems are well known in the art and a description thereof is not necessary for a complete understanding of the present invention which has to do with the expendable thermocouple unit 1. In use, the end of the manipulator 2 provided with a thermocouple unit 1 is thrust into a bath of molten metal to immerse the thermocouple element of the unit in the bath. After a temperature measurement has been made, the manipulator is withdrawn from the furnace containing the bath, the thermocouple unit is removed from the manipulator and replaced by an unused unit for making another temperature measurement. The time during which the thermocouple element is immersed in the molten bath is the order of seconds. Usually an immersion time of 6 seconds or less is sufficient for the thermocouple element to sense the temperature of the bath.

The expendable thermocouple unit 1 includes as part thereof a sleeve 9 of heat insulating material, such as paper or fiberboard or the like which slips over the end portion of the manipulator and makes a friction fit therewith. The sleeve 9 has mounted in one end thereof the thermocouple assembly shown in detail in FIGS. 2–9 which closes the end of the sleeve 9 against the entrance of molten metal into the interior of the manipulator 2. The sleeve 9, which is suitably about 4 feet in length, protects the parts of the manipulator such as the receptacle 4, and the parts of the thermocouple assembly from excessive heat when the end portion of the manipulator is immersed in the molten metal bath in making a temperature measurement.

The thermocouple element of the unit 1 consists of two wires 10 and 11 of dissimilar metals joined together to form a heat responsive or measuring junction 12. The thermocouple element extends through a U shape thin walled tube 13 of refractory material such as glass or fused quartz which serves as a supporting sheath for the thermocouple. The ends 14, 15 of the wires 10, 11 depend below the lower ends 16, 17 of the tube 13 to form leads for making electrical connections to the thermocouple element. The ends 16, 17 are supported on seats 18, 19 at the outer ends of flexible arms 20, 21 on a U shaped support having its base portion 22 integral with an offset arm 23 on the upper end of a post 25, whose lower end depends below the lower ends of the leads 14, 15. The lower end of the post is provided with pins 26 removably received in sockets 27 to removably support the post and the thermocouple element carried thereby on the upper end of a plug member 28. The support for the thermocouple element is conveniently molded of plastic. The arms 20, 21 have sufficient resilience to accommodate the dimensional variations of the refractory tube 13 and to accurately position and hold the lower ends 16, 17 of the tube. The thermocouple element and its support comprise a convenient subassembly as shown in FIG. 2.

The plug 28, which is conveniently molded of plastic, has a hollow tubular portion at 29 at its lower end, a disc 30 at its center, and four upstanding ribs 31, 32, 33, 34 at its upper end, the ribs being substantially 90° apart. The rib 32 has a groove 35 open at its top, outer side and bottom for receiving negative thermocouple conductor 36. The rib 34, which is diametrically opposite the rib 32, is provided with a similar groove 37 for receiving positive conductor 38. The grooves 35, 37 extend through the disc 30. When received in the grooves 35 and 37, the negative and positive conductors project above the upper end of the plug 28 and terminate in tabs 39, 40, which are welded or otherwise connected to the leads 14, 15. In line with the slot or groove 35 are slots 41a and 41b which extend through the tubular portion 29. Between the slots 41a and 41b is an uninterrupted wall section 42 over which the lower end 43 of the negative conductor 36 is hooked. The hooked lower end 43 is a loop with the open end of the loop facing radially inward and with axially spaced upper and lower sides 43a, 43b extending radially inward of the outer surface of section 42 and with a section 44 extending radially outward of the outer surface of section 42. The upper side 43a is in direct continuation of the upper portion of the conductor 36. The section 44 of the conductor overlying the outer side of the uninterrupted portion 42 provides a contact for making electrical connection to the contact 7. In line with the lower end of the slot or groove 37 is a slot 45 receiving positive conductor 38. At the lower end of the slot 45 is an uninterrupted section 46 over which the lower end 47 of the conductor 38 is hooked. The hooked lower end 47 of the conductor is a loop with the open end of the loop facing radially inward and with axially spaced upper and lower sides 47a, 47b extending radially inward of the outer surface of the lower end of the plug and with section 48 extending radially outward of the outer surface of section 46. The upper side 47a of the loop is in direct continuation of the upper portion of the conductor 38. The section 48 overlying the outer part of the uninterrupted section 46 provides a contact for making connection to the contact 6.

The conductors 36 and 38 are easily assembled by inserting through the open outer sides of the slots. The conductor insertion is adapted to automatic machinery. When inserted, the conductors are frictionally held in place by engagement with the sides of the slots. The hooked lower ends 43, 47 when engaged with sections 42, 46 provide accurate vertical location of the tabs 39, 40 above the upper end of the plug member 28. The engagement of straight sections 49, 50 of the conductors with the bottoms of the slots 35, 37 provides accurate lateral spacing of the tabs 39, 40. A bend 51 in the conductor 36 of height slightly greater than the depth of the slot 35 substantially closes the lower end of the slot 35 so that flow of liquid cement out the lower end of the slot is substantially prevented. A similar bend 52 in the conductor 38 blocks the lower end of the slot 37.

The plug member 28 and the assembled conductors 36 and 38 constitute another subassembly. When the subassembly carrying the thermocouple (FIG. 2) is assembled on the plug subassembly by insertion of the pins 26 in the sockets 27, the leads 14, 15 of the thermocouple element are accurately positioned relative to the tabs 39, 40 to make connection by welding easy. At this stage, necessary tests on the thermocouple may be performed.

The thermocouple unit is both electrically connected to the contacts and mechanically positioned with relation to the plug.

The next stage in the manufacture of the unit consists of pressing the assembly of the plug element and thermocouple element up through reentrant tubular walls 53 of a cylindrical plastic housing 54 until the disc 30 on the plug 28 bottoms against bevelled surface 55 at the lower end of the housing. The inside diameter of the reentrant wall 53 is less than the outside diameter of the ribs 31–34 so that as the plug element is pressed into place, the reentrant walls 53 are stretched and provide a tight friction fit. The outer ends of the bends 51, 52 make contact with the reentrant walls 53 and cause the conductors 36, 38 to be forced tightly against the bottoms of the slots 35, 37. The assembly is completed by filling the housing 54 substantially full of electrical and thermal insulating refractory cement, curing the cement, and then fastening the conventional protective metal cap 56 to the rim 57 of the housing. The refractory cement fills the entire space within the housing and above the disc 30 on the plug element. The lower ends of the refractory tube 13 and the connections between the leads 14, 15 and the tabs 39, 40 are embedded in the cement.

What is claimed is:

1. An expendable thermocouple unit for immersion in molten metal and the like comprising three separate components,
   a first component comprising a support member having laterally spaced upwardly facing seats, a thermocouple encased in an inverted U shaped tubular glass with lower ends of the U seated on the seats of said support and leads depending from the lower ends of the U,
   a second component comprising a plug having contacts at its lower end and conductors extending upward from said contacts and terminating in laterally spaced tabs at the upper end of the plug,
   said plug being a body with a lower end in the form of a projection shaped to be received in the receptacle of a manipulator and with two slots extending axially from the lower end to the upper end of the body and extending into the body from the outer surface of the body,
   said conductors being of one piece with one conductor in each of said slots, the upper end of the conductor being one of said tabs at the upper end of the plug and the lower end of the conductor being one of said contacts on said lower end of the plug,
   said slots being located to position the conductors with said tabs laterally spaced from each other,
   and a third component comprising a cylindrical shaped housing open at both ends,
means for mounting the first component on the second component with the tabs in position to be welded to the leads, the assembly of the first and second components supporting the thermocouple element and the welding of leads to the tabs connecting the thermocouple to said contacts, and means for mounting the assembly of the first and second components in the housing and for closing the lower end of the housing, and an electrical and thermal insulating cement filling the housing up to a level above the support and the lower ends of the glass but below the upper end of the U, said cement embedding said support and the upper ends of said plug and conductors and the lower ends of the glass and the connections between the leads and the tabs.

2. The unit of claim 1 in which the support comprises an upwardly extending post on the upper end of the plug extending above said tabs, and arms extending from the post and having laterally spaced seats for said lower ends.

3. The unit of claim 2 in which the means for mounting the first component on the second component comprises telescoping projections and depressions in the plug and post.

4. The unit of claim 1 in which the upper end of the plug has axially extending and outwardly projecting angularly spaced ribs with the outer edges of the ribs radially outside said lower end of the plug and in which part of one of said slots consists of a longitudinal groove in the outer edge of one of the ribs open at its outer side and its upper and lower ends for receiving one of the conductors.

5. The unit of claim 4 in which the plug has a disc below the ribs closing the space between the ribs and in which part of one of said slots consists of a groove in said disc in alignment with the groove in said one rib and open at the outer side of the disc.

6. The unit of claim 4 in which a cylindrical housing surrounds the upper end of the plug and the lower end of the thermocouple element and the connections to tabs, said housing having at the bottom an upwardly extending reentrant wall surrounding the ribs and gripping the ribs to hold the plug in the housing.

7. An expendable thermocouple unit comprising a plug having contacts at its lower end and conductors extending upward from said contacts and terminating in laterally spaced tabs at the upper end of the plug, said plug being a body with a lower end in the form of a projection shaped to be received in the receptacle of a manipulator and with two slots extending axially from the lower end to the upper end of the body and extending into the body from the outer surface of the body, said conductors being of one piece with one conductor in each of said slots, the upper end of the conductor being one of said tabs at the upper end of the plug and the lower end of the conductor being one of said contacts on said lower end of the plug, said slots being located to position the conductors with said tabs laterally spaced from each other, an upwardly extending post on the upper end of the plug, a thermocouple element encased in an inverted U-shaped tubular glass with leads depending from the lower ends of the U, and connected to said tabs, and a support extending from the post and having laterally spaced seats for the lower ends of the U-shaped glass sleeve.

8. The unit of claim 7 in which the post and support is a separate part into which the thermocouple element may be assembled, said post having means remote from the thermocouple element for assembling it to the plug.

9. The unit of claim 8 in which the means for assembling the post to the plug comprises telescoping projections and depressions on the post and plug.

10. The unit of claim 7 in which said contact portion of one of the conductors comprises a loop with the open end of the loop facing radially inward and the upper and lower axially spaced sides of the loop extending radially inward of the outer surface of the lower end of the plug and with the portion of the loop between said sides extending radially outward of the outer surface of the lower end of the plug serving as one of the contacts and with said upper side of the loop in direct continuation of the upper portion of said one conductor.

11. The unit of claim 10 in which the lower end of the plug is a tube and the sides of the loop extend radially inward through the wall thickness of the tube.

12. The unit of claim 7 in which the upper end of the plug has axially extending and outwardly projecting angularly spaced ribs with the outer edges of the ribs radially outside said lower end of the plug and in which part of one of said slots consists of a longitudinal groove in the outer edge of one of the ribs open at its outer side and its upper and lower ends for receiving one of the conductors.

13. The unit of claim 12 in which part of one of said slots consists of a groove in said disc in alignment with the groove in said one rib and open at the outer side of the disc.

14. The unit of claim 4 in which said one of the conductors has a V bend adjacent the lower end of said groove and of height substantially the depth of said groove blocking the lower end of said groove.

15. The unit of claim 14 in which said one of the conductors has a V bend of height greater than the depth of the groove engaging said reentrant wall and forcing said one conductor to the bottom of the groove.

* * * * *